Oct. 18, 1932.  A. W. SWARTZ  1,883,086
FLEXIBLE PIPE AND COUPLING
Filed July 10, 1931
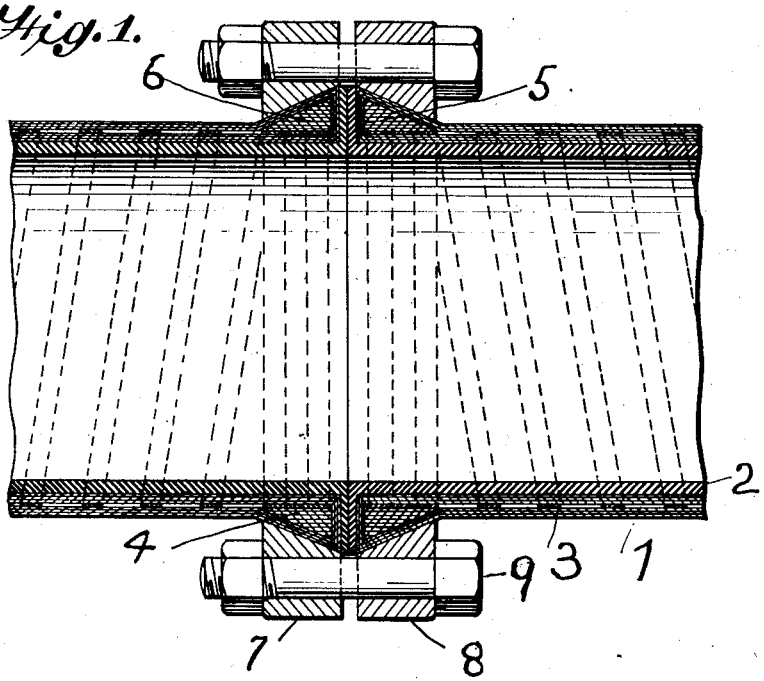
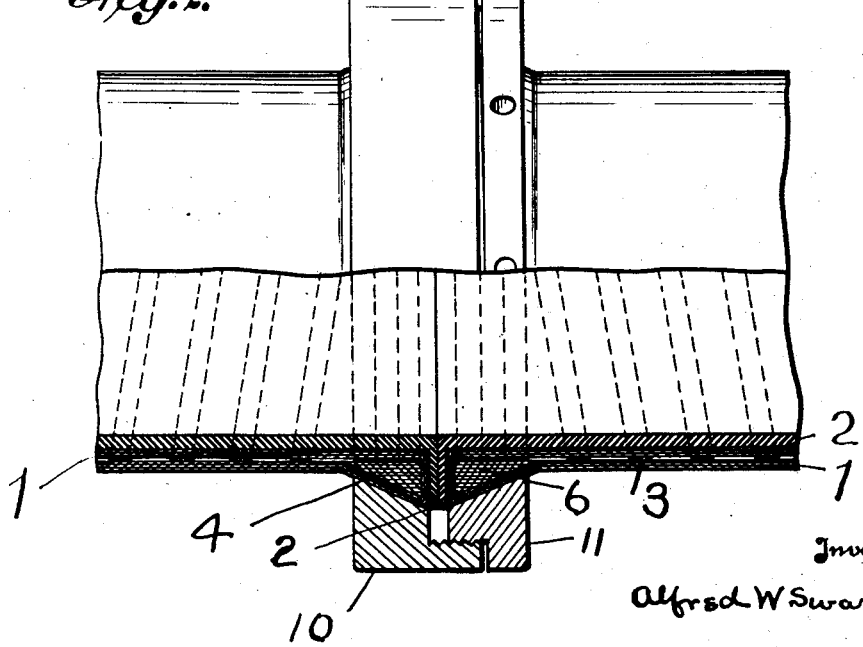
Inventor
Alfred W Swartz
By Augustus B Stoughton
Attorney Patented Oct. 18, 1932

1,883,086

UNITED STATES PATENT OFFICE

ALFRED W. SWARTZ, OF HAVERFORD, PENNSYLVANIA, ASSIGNOR TO LINEAR PACKING & RUBBER CO. INC., OF TACONY, PHILADELPHIA, PENNSYLVANIA, A CORPORATION OF PENNSYLVANIA

FLEXIBLE PIPE AND COUPLING

Application filed July 10, 1931. Serial No. 549,911.

The present invention relates to flexible pipes or pressure hose or vacuum of duck and rubber or rubber material and couplings therefor, and in the following description and for the sake of brevity, the word "pipe" will be used.

The principal objects of the present invention are to provide for coupling pipes of plies of duck and rubber material without exposing any metal to the contents thereof; to provide rubber to rubber contact at the coupled end portions of such flexible pipes; to avoid reduction of the internal diameter or obstruction of the bore of the coupled parts of such flexible pipe; to provide an end construction for sections or lengths of flexible pipe of layers of duck and rubber whereby they can be satisfactorily coupled together or to any flange; and to provide a simple, reliable and efficient construction for the end parts of such flexible pipes, whereby the objects enumerated, or hereinafter appearing, are attained.

To these and other ends hereinafter set forth the invention, generally stated, comprises a section of flexible pipe of duck and rubber provided with a rubber lining and having at its end a projecting beveled rim faced with rubber.

The invention also comprises the improvements to be presently described and finally claimed.

In the following description reference will be made to the accompanying drawing forming part hereof and in which Figure 1 is a longitudinal central section of flexible rubber lined duck and rubber pipes and of a coupling therefor embodying features of the invention, and Fig. 2 is an elevational view, partly in section, illustrating a modification of the coupling collar.

In the drawing is shown a pipe of rubber and duck plies 1, and it is provided with a rubber lining 2, including of course rubber material. It is also provided with a spiral metal winding 3. The illustration is somewhat conventional for the sake of clearness in that it shows the plies between the turns of the spiral windings spaced apart, whereas in fact they contact. The purpose is to clearly show the disposition of the turns of the spiral windings about to be described. Internally it is cylindrical and externally it is provided with a flaring end portion 4, having a flat face 5. The rubber lining 2 extends outwardly on the flat face. The turns of the spiral winding are closely spaced at the end portion. The described construction can be made by inserting a beveled ring 6 as of duck and rubber outside of the inner plies and of the spiral winding and inside of the outer plies which are folded around the wedge as a continuous structure. Referring to Fig. 1, the collar is made in two parts 7 and 8, each internally beveled, and they are joined or connected by bolts 9. The beveled parts of the collar in cooperation with the beveled ends of the pipe sections serve to provide a tight joint at the portion of the rubber lining 2 which overlies the flat end face of the rim. Where two pipe sections are coupled together the joint at the coupling is rubber to rubber. Evidently in assembling the coupling the parts 7 and 8 thereof can be relatively turned in order to bring the bolt holes into alignment.

The construction and mode of operation of the modification illustrated in Fig. 2 are as above described except that the parts 10 and 11 of the collar are screwed together. The closely spaced turns of the spiral winding 3 at the end portions of the pipe afford internal support in the nature of an abutment when the parts of the collar are drawn together.

It will be obvious to those skilled in the art to which the invention relates that modifications may be made in details of construction and arrangement and in matters of mere form without departing from the spirit of the invention which is not limited to such matters or otherwise than the prior art and the appended claims may require.

I claim:

1. A flexible pipe of duck and rubber plies provided with a spiral winding and with a rubber lining and having at its end portion a ring in cross section of wedge form arranged outside of its lining and inside of its outer ply which is folded around the wedge, said lining extending outwardly on the end portion of the pipe and on the flat face of the ring, and the turns of said spiral being closely spaced inside of said ring.

2. A flexible pipe of duck and rubber plies provided with a rubber lining and having at its end portion a beveled ring arranged outside of lining and inside of a fold of its outer ply, and the rubber lining extending outwardly on the end portion of the pipe and ring.

3. A flexible pipe of duck and rubber having in combination, an outer ply and a lining, and a ring of wedge shaped cross section arranged at the end of the pipe and in a fold of the outer ply with its inclined face disposed to flare outwards towards the end of the pipe.

4. A flexible pipe of duck and rubber having in combination, an outer ply and a lining, a ring of wedge shape in cross section arranged at the end of the pipe and in a fold of the outer ply with its inclined face disposed to flare outwards towards the end of the pipe, a collar element provided with a beveled face, and means spaced outside and clear of the pipe for connecting the collar element.

ALFRED W. SWARTZ.